No. 686,598. Patented Nov. 12, 1901.
Q. N. EVANS.
EXPANSION JOINT FOR PIPES.
(Application filed July 2, 1901.)
(No Model.)

WITNESSES:
René Bruine
Domingo N. Usina

INVENTOR:
Quimby N. Evans,
By Attorneys,

UNITED STATES PATENT OFFICE.

QUIMBY N. EVANS, OF BROOKLYN, NEW YORK.

EXPANSION-JOINT FOR PIPES.

SPECIFICATION forming part of Letters Patent No. 686,598, dated November 12, 1901.

Application filed July 2, 1901. Serial No. 66,901. (No model.)

*To all whom it may concern:*

Be it known that I, QUIMBY N. EVANS, a citizen of the United States, residing in the borough of Brooklyn, county of Kings, city and State of New York, have invented certain new and useful Improvements in Expansion-Joints for Pipes, of which the following is a specification.

My invention aims to provide an improved expansion-joint such as is common in pipes for carrying hot water or steam or which for any other reason are subject to variations in temperature and consequent variations in length.

According to my improvement the joint is so made as to insure tightness and greater durability than is the case in similar joints at present in use.

Figure 1:
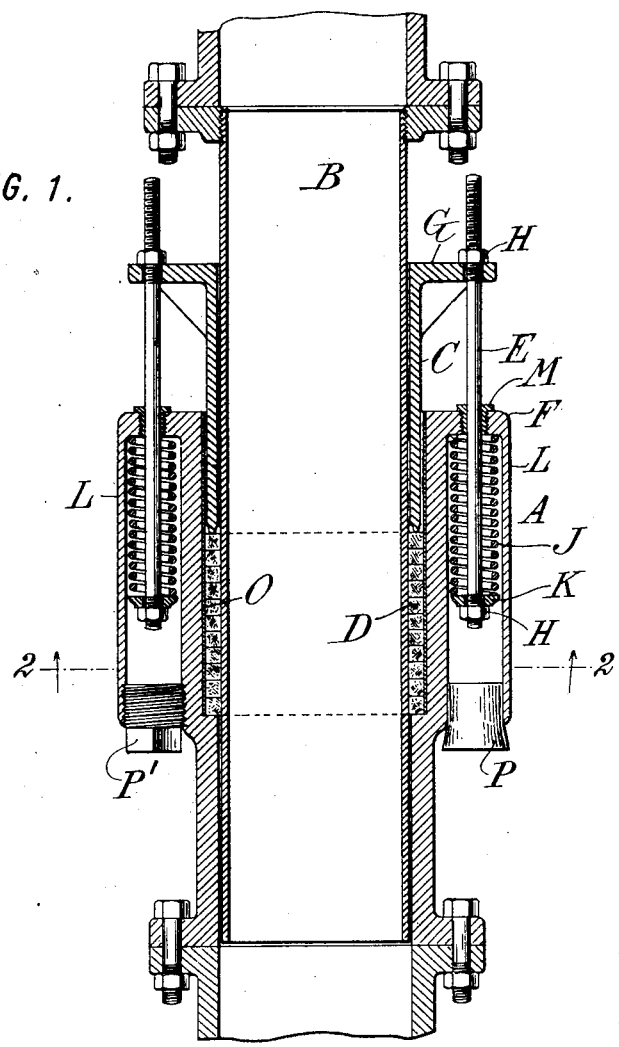
Figure 2:
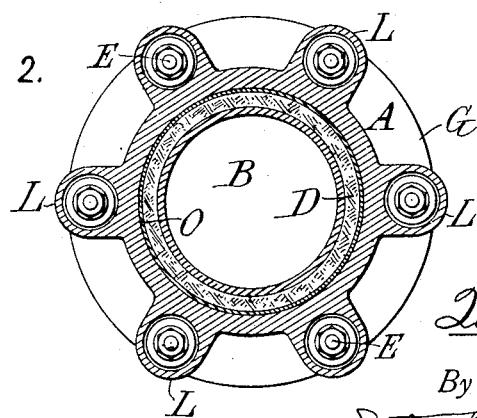

Referring to the drawings, which show an embodiment of my invention, Figure 1 is a central longitudinal section, and Fig. 2 is a transverse section on the line 2 2.

In expansion-joints as at present in use, and especially in those adapted to be laid under ground or to be otherwise exposed to the action of the elements, great difficulty is experienced in obtaining a joint which shall be tight and which shall remain tight after it has been in use for a considerable time. The packing material loses its elasticity by reason of the heat and moisture to which it is subjected, and the parts usually become corroded (unless made entirely of expensive material, such as brass) and do not move readily upon one another, so as to yield easily to the lengthening or shortening of the pipe, as desired. According to my invention the pressure on the packing is maintained substantially the same even if it should shrink considerably in use and regardless of the relative movement of the pipe-sections. This is provided for by the use of a gland which presses the packing down in a socket about the inner pipe by the action of a spring or springs whose tension is preferably adjustable, so that the gland follows the packing as the latter shrinks and presses it down with a substantially constant pressure after the joint has been in long use, as well as during the first use of the same. Preferably the socket on one pipe surrounds a section of the other pipe, movable relatively thereto, and in this socket is any suitable packing material which is pressed down by a gland in a well-known way, the socket and gland being provided with flanges between which are connecting-rods. By screwing up bolts on the rods the two flanges are brought toward each other, so that the gland compresses the packing about the inner section of pipe. The most convenient arrangement of the springs is to place them between one of the flanges and a head or nut on the bolts.

Referring now to the drawings, A represents as a whole the socket on the lower section of pipe; B, the end of the upper section, which fits into and slides within the socket of the lower section as the pipe expands or contracts; C, the gland which surrounds the pipe B and fits into the socket A, and D the packing, which may be of any suitable material. The gland is drawn into the socket by means of rods E, which pass through flanges F on the socket and flanges G on the gland and which may be drawn up by means of nuts H at either end. The spring feature is preferably provided by arranging suitable helical springs J between one of the flanges and a head K on each of the rods E, the same being shown as applied to the flange of the socket.

In setting up the joint the bolts H are screwed down on the rods E until the spring is compressed to any desired degree. The gland will thereafter automatically adapt itself to any shrinkage in the packing D and press thereon with a force nearly equal to that originally applied, so that there will be no greater leakage after the device has been in long use than when it is first set up.

In order to protect the springs J, especially where the pipes are to be laid under ground, I preferably place them in pockets L, formed on the flange F. As shown in Fig. 2, I provide six of these pockets L in the circumference of the flange, the flange being, in fact, cut away between the adjacent pockets, so so that the upper closed ends of the several pockets form, in fact, the entire flange. This arrangement of the flange of course, as well as the number of pockets and springs employed, is within the discretion of the manufacturer. At the point through which the rods pass into the pockets and through the flange F, I prefer to provide plugs M, of brass or similar non-corrosive material, which are fitted to the rod with a close working fit to prevent the introduction of dirt during the movement of the rod backward and forward.

I may also close the other ends of the pockets L after the spring and rod have been put in place and set up by means of plugs of any suitable sort—such, for example, as the wooden plug P, driven in the end, or the screw-plug P', as shown at opposite sides of Fig. 1.

As the joint is designed to be used with water, steam, &c., ordinary cast-iron would not be suitable for most of the parts, as it would corrode, and thereby hamper the free relative movement of the parts, which is desirable in order to prevent their subjection to temperature strains. I arrange for the use of a cast-iron socket-piece, however, by casting the same, as shown, and by fitting to the inside face of the socket a lining O, of non-corrosive sheet metal—such, for example, as brass. The gland also and the tube B are preferably of brass or the like.

It will be seen that my invention provides an improved expansion-joint which is adapted for much longer and more perfect usefulness than previous joints of the same general nature and which is well protected against deterioration due to the action of heat or moisture or the like on the packing or due to corrosive action upon the metals of the joint and in which the springs are well protected against accidental injury as well as from contact with the earth, so that the period of the life of my joint may be considered to be substantially equal to that of the material of which they are composed.

Various modifications of the details and of the general arrangement of the parts of my improved expansion-joint are possible to those skilled in the art without departure from the spirit of the invention.

What I claim is—

1. In an expansion-joint, the combination of an outer pipe-section having a socket, an inner section sliding in said socket, a gland fitting in said socket, and a direct spring connection between said socket and gland tending to draw said gland into said socket independently of the position of said inner section.

2. In an expansion-joint, the combination of an outer pipe-section having a socket, an inner section sliding in said socket, a gland fitting in said socket, a direct spring connection between said socket and gland tending to draw said gland into said socket independently of the position of said inner section, and means for adjusting the tension of said spring connection.

3. In an expansion-joint, the combination of a socket, a gland fitting in said socket, flanges on said gland and socket respectively, rods connecting said flanges, and a spring interposed between said rods and one of said flanges.

4. In an expansion-joint, the combination of a socket, a gland fitting in said socket, flanges on said gland and socket respectively, one of said flanges being formed with pockets, headed rods connecting said flanges and extending into said pockets, and springs in said pockets between the flange and the heads of said rods.

5. In an expansion-joint, the combination of a socket, a gland fitting in said socket, flanges on said gland and socket respectively, one of said flanges being formed with pockets, headed rods connecting said flanges and extending into said pockets, and springs in said pockets between the flange and the heads of said rods, said pockets being closed at both ends.

6. In an expansion-joint, the combination of a socket, a gland fitting in said socket, flanges on said gland and socket respectively, one of said flanges being formed with pockets, headed rods connecting said flanges and extending into said pockets, springs in said pockets between the flange and the heads of the rods, and nuts on the ends of said rods for adjusting the tension of said rods.

7. In an expansion-joint, the combination of a socket of cast-iron having a lining of non-corrosive sheet metal, a compressible packing therein, a gland, and means for forcing said gland into said socket to compress said packing.

In witness whereof I have hereunto signed my name in the presence of two subscribing witnesses.

QUIMBY N. EVANS.

Witnesses:
DOMINGO A. USINA,
FRED WHITE.